United States Patent [19]
Zydek et al.

[11] Patent Number: 5,614,798
[45] Date of Patent: Mar. 25, 1997

[54] CIRCUIT CONFIGURATION FOR IDENTIFYING A SHORT CIRCUIT OR SHUNT EVENT IN A SERVOMOTOR SYSTEM

[75] Inventors: Michael Zydek, Frankfurt am Main; Mario Engelmann, Neu-Anspach; Lothar Spornitz, Frankfurt am Main, all of Germany

[73] Assignee: Alfred Teves GmbH, Frankfurt, Germany

[21] Appl. No.: 487,915

[22] Filed: Jun. 7, 1995

Related U.S. Application Data

[63] Continuation of Ser. No. 50,386, filed as PCT/EP91/01726, Sep. 11, 1991.

[30] Foreign Application Priority Data

Nov. 5, 1990 [DE] Germany ............... 40 35 067.3

[51] Int. Cl.$^6$ ........................................ H02P 1/22
[52] U.S. Cl. .............................. 318/434; 361/93
[58] Field of Search ........................ 318/434, 456, 318/458, 560, 563, 565, 566; 323/908; 324/522, 523, 537, 772, 545, 546; 361/23, 31, 93–98, 100, 101

[56] References Cited

U.S. PATENT DOCUMENTS

| | | | |
|---|---|---|---|
| 3,889,159 | 6/1975 | Wessel | 361/88 |
| 4,536,686 | 8/1985 | Gartner | 318/434 |
| 4,686,598 | 8/1987 | Herr | 361/31 |
| 4,725,765 | 2/1988 | Miller | 318/434 |
| 4,809,122 | 2/1989 | Fitzner | 318/434 X |
| 4,873,453 | 10/1989 | Schmerda et al. | 318/434 X |
| 4,918,564 | 4/1990 | Walker et al. | 361/94 |
| 5,012,168 | 4/1991 | Dara et al. | 318/434 |
| 5,038,090 | 8/1991 | Kawabata et al. | 318/811 X |
| 5,111,123 | 5/1992 | Hach et al. | 318/434 |
| 5,345,180 | 9/1994 | Maier et al. | 324/537 |

FOREIGN PATENT DOCUMENTS

| | | |
|---|---|---|
| 2736304 | 2/1979 | Germany . |
| 3042138 | 5/1982 | Germany . |
| 3318909 | 12/1983 | Germany . |
| 3727498 | 3/1989 | Germany . |
| 3836516 | 5/1989 | Germany . |
| 3819166 | 12/1989 | Germany . |
| 2020928 | 11/1979 | United Kingdom . |
| 2056799 | 3/1981 | United Kingdom . |

*Primary Examiner*—Brian Sircus
*Attorney, Agent, or Firm*—Thomas N. Twomey; J. Gordon Lewis

[57] ABSTRACT

A circuit configuration for the control of a servomotor (M) with the aid of current pulses supplied by a current-controlled final stage (1) of a control system. The pattern of current rise is analyzed after actuation of the final stage (1) for identifying a short circuit in the servomotor (M) across the power supply system (+$U_B$). An excessively high current ($I_K$), after a measuring period ($T_M$), commencing after the transistor (LT) of the final stage (1) has been placed in saturated state, is indicative of a short circuit.

19 Claims, 1 Drawing Sheet

CIRCUIT CONFIGURATION FOR IDENTIFYING A SHORT CIRCUIT OR SHUNT EVENT IN A SERVOMOTOR SYSTEM

This application is a continuation of application Ser. No. 08/050,386 filed Jun. 30, 1993.

BACKGROUND OF THE INVENTION

The present invention relates to a circuit configuration for controlling a servomotor by means of current pulses supplied by a current-controlled final stage. This circuit configuration is particularly suitable for controlling a servomotor of a control system for automotive vehicles, for example, the throttle valve-type servomotor of a traction slip control system.

A short circuit across the voltage source of a servomotor of the type under consideration (e.g. a short circuit across the power supply system of an automotive vehicle), during actuation of the motor through a current-controlled final stage, is difficult to identify because, with the short-circuited motor, the actual current value, as a result of the control, corresponds to the nominal value of the current. To identify a short circuit, instead of measuring the current, for example, the final stage voltage can be monitored. With the motor intact and upon actuation through a transistor, the voltage would fall to the saturation voltage of the transistor. When short circuit or shunt events occur within the motor, the voltage drop is substantially higher than in normal operation. However, the additional efforts involved with such a saturation voltage monitoring by no means are irrelevant.

German published application DE 33 18 909 C2 teaches an error-detection device for a motor control circuit which comprises a voltage divider, connected in parallel to the current source, and a comparator circuit. This comparator circuit monitors the voltage on a voltage divider point and generates an error signal once this voltage rises or drops to a value outside a predetermined voltage range as a result of an error (e.g. fusing of contacts, short circuit in the electronics).

To control the number of revolutions of a series-wound motor with a torque shutoff device which serves to drive a manually operated electric tool, a circuit configuration is described in German published application DE 38 19 166 A1 which switches off the motor upon the occurrence of a specific counter-torque. The motor current received is measured and evaluated as an indication of the issued torque.

A protection circuit device as disclosed in German published application DE 30 42 138 A1, which serves as an overload protection when a direct-current motor blocks, triggers a disconnection in the event that an excessive motor current is detected which lasts for more than a predetermined period of time.

Further, a device for the adjustment of the current of a battery to an electric motor is known from German published application DE 27 36 304 A1 which disconnects the current supply to the electric motor when a motor current pulse occurs.

Finally, a device for controlling the power of an electric consumer and comprising a short circuit monitoring means is described an German published application DE 37 27 498. For this purpose, the saturation voltage of a semiconductor switch is monitored which exceeds a predefined value once a short circuit occurs.

SUMMARY OF THE INVENTION

It is, therefore, an object of the present invention to provide a simple circuit configuration which is suitable to reliably identify a short circuit or shunt event within the servomotor or in the supply line thereof, which shows up across the power supply system of the automotive vehicle.

It has been shown that this problem can be solved by a circuit configuration of the aforementioned type, the characteristic feature of which is that the rise pattern of the current flowing, after actuation of the final stage, to the servomotor, through the final stage, is evaluated for identifying a short circuit or shunt event across the power supply system.

The invention is based on the recognition that, with an intact engine, the current rise in the motor winding is determined by the high inductance of the servomotor. A short circuit or shunt, therefore, involves a substantially less reduction in inductance and, hence, a substantially more rapid rise in current flowing, after actuation of the final stage, through the final stage. As in current-controlled final stages, for example, in the control by width-modulated current pulses, a current meter is already provided, based on that consideration, so that by metering the pattern of the rise in current, short circuit monitoring can be realized without requiring any substantial extra efforts or, at most, with negligible extra efforts.

According to an advantageous embodiment of the present invention, the final stage comprises a power transistor placed in saturated state, and a current measuring resistance.

According to another aspect of the present invention, the peak value of the current flowing through the power transistor, measured after a period of time of predetermined short duration or within the period of time after the power transistor has been placed in the saturated state, is evaluated for identifying a short circuit or shunt event. The predetermined period of time, preferably is within the range of between 10 and 100 µs.

In some cases, it has proved to be advantageous for the short circuit monitoring to regularly actuate the final stage by test pulses so short in length compared to the electromechanical time constant of the servomotor that no response of the servomotor is caused as yet, thereby attaining a permanent short circuit monitoring and an immediate display of an error, if any.

Further features, advantages and fields of end-use application of the present invention will become apparent from the following description of one embodiment of the present invention with reference to the drawing.

DETAILED DESCRIPTION OF THE INVENTION

Figure 1:
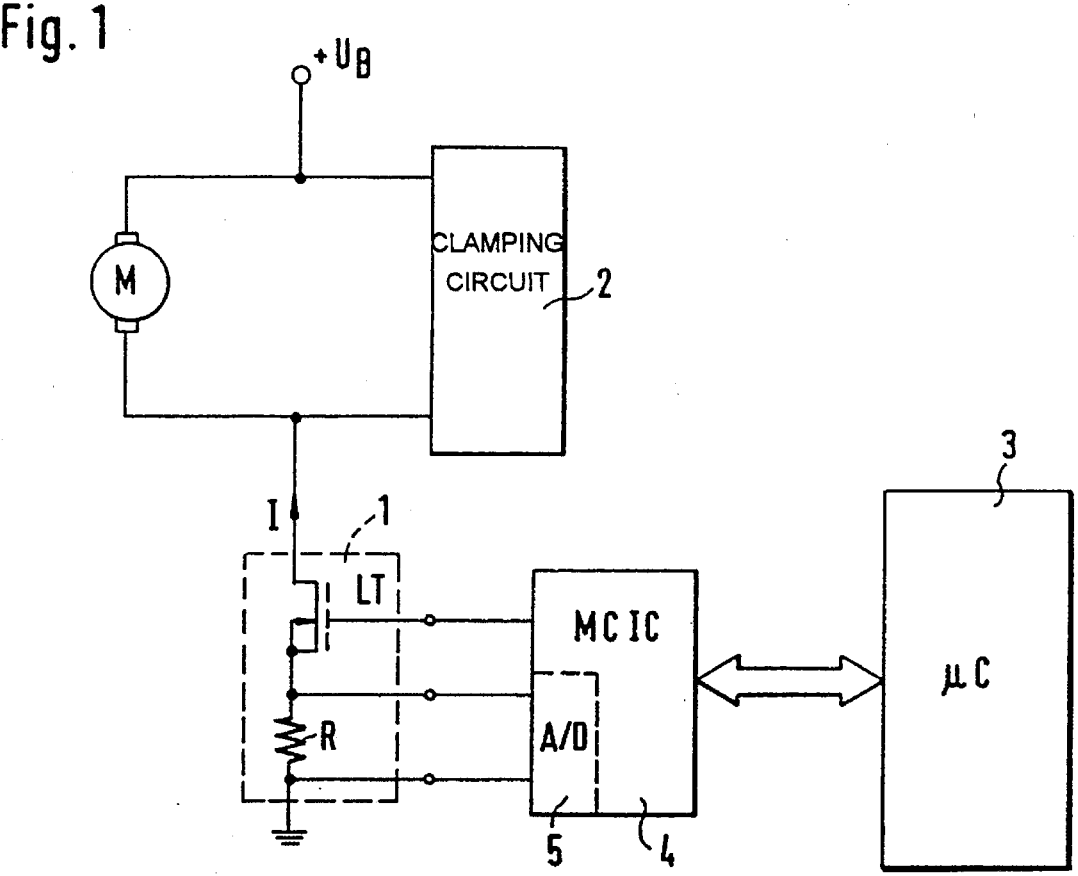
FIG. 1 is a diagram of the basic construction of a circuit configuration according to the present invention.

Referring to the drawing, FIG. 1 shows a servomotor M serving, for example, to control a throttle valve (not shown) of a driving motor of an automotive vehicle and being part of a traction slip control system. For the supply of current, the servomotor M, on the one hand, is connected to the positive terminal of the battery of the automotive vehicle which is identified by the $+U_B$ symbol, and, on the other hand, is connected to a final stage 1 of a control system. A freewheel clamping circuit 2, in known manner, precludes the generation of excessive transient voltages once the servomotor M is rendered inoperative, thereby protecting the final stage 1.

The servomotor M, in the presently described example of a throttle valve-type servomotor of a traction slip control system, is controlled by width-modulated current pulses. For that purpose, the final stage 1 includes a power transistor LT, placed in a saturated state, and a low-ohmic current measuring resistance R. The final stage transistor LT is controlled by a microcontroller 3 wherein, in known manner, the nominal position of the throttle valve is computed from the information obtained with the aid of sensors from which corresponding control commands are derived. The microcontroller 3, through interface 4 presently designated by motor-control-IC (MCIC), is connected to the final stage 1. A portion of the circuit 4, indicated by a broken line, represents an analog/digital transducer A/D by which the analog signals, tapped from the measuring resistance R and being in proportion to the actual current flow, are converted into corresponding digital signals. Subsequently, the digital signals are stored and analyzed in the microcontroller 3.

Figure 2:
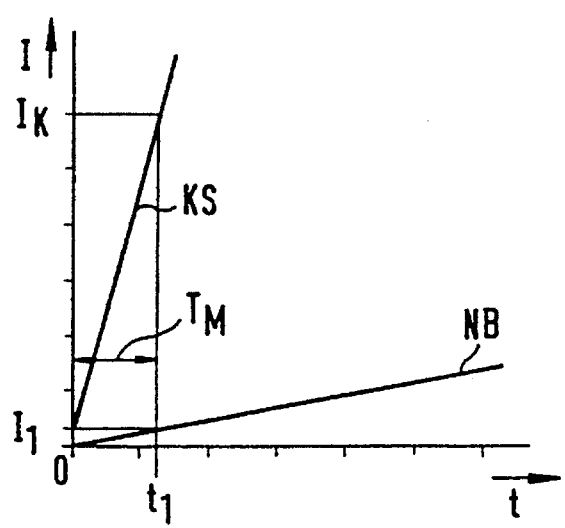
FIG. 2 is a diagram of the pattern of current rise during normal operation and during a short circuit event of the FIG. 1 circuit configuration.

FIG. 2 illustrates the pattern of current rise in normal operation upon actuation of an intact servomotor M (characteristic NB) compared to the pattern of current rise in the event of short circuit or shunt events (characteristic KS).

In accordance with the present invention, upon actuation of the servomotor M and after transistor LT of the final stage 1 has been placed in the saturated state, the pattern of current rise is determined after the lapse of a predetermined period of time $T_M$. If, at the time $t_1$, the current has increased to a value $I_1$, this is indicative of an intact system. However, if a current $I_K$ is measured, after the period of time $T_M$ or at the time $t_1$, this is indicative of a short-circuit between the feed line of the servomotor M and between the output of the final stage 1 and the power supply system $+U_B$, respectively. The inductance of the servomotor M would otherwise preclude a rise in current to $I_K$ within the measuring period of time $T_M$.

A short circuit or a shunt resulting in a markedly higher current than in normal operation NB, hence, is clearly identified by analyzing the pattern of current rise. Since, as previously mentioned, a current measurement through a current metering resistance R and an A/D transducer is already needed in control systems of the presently described type, short circuit monitoring, according to the invention, can be achieved without any substantial extra effort.

We claim:

1. A circuit configuration for the control of a servomotor of a control system for use with automotive vehicles comprising:

a final stage including a power transistor and a current measuring resistance;

means for actuating the final stage;

means, after actuation of the final stage, for directly sensing and storing values representing the gradient of the current flowing, based on the inductance of the servomotor, through the final stage throughout a predetermined period of time and for identifying a short circuit or shunt event within the servomotor or a supply line based on the stored values, said current flow being sensed by said means for sensing with respect to the current measuring resistance.

2. A circuit configuration according to claim 1, wherein the power transistor is placed in a saturated state during actuation of the final stage.

3. A circuit configuration according to claim 2, wherein the current flowing through the power transistor and measured throughout the predetermined period of time, after the power transistor having been placed in saturated state, can be evaluated for identifying a short circuit.

4. A circuit configuration according to claim 3, wherein the predetermined period of time is within the range of 10 and 100 microseconds.

5. A circuit configuration according to claim 2, wherein a peak value of the current flowing through the power transistor and measured within the predetermined period of time after the power transistor having been placed in saturated state, is determined and can be evaluated for identifying a short circuit.

6. A circuit configuration according to claim 1, wherein the means for actuating the final stage is for regularly actuating the final stage using test pulses of a length short enough compared to the electromechanical time constants of the servomotor so as to cause the servomotor not to respond.

7. A circuit configuration for the control of a servomotor according to claim 1 wherein said control system is a traction slip control system of an automotive vehicle.

8. A circuit configuration for the control of a servomotor according to claim 1, further including a source of electrical power, wherein said source of electrical power, said servomotor and said final stage of said control system are connected in series.

9. A circuit configuration for the control of a servomotor according to claim 1 wherein said current flow through said power transistor is measured for the predetermined period of time after said power transistor has been placed in a saturated state.

10. A circuit configuration for the control of a servomotor according to claim 9 wherein a peak value of said measured current flow through said power transistor is determined.

11. A circuit configuration for the control of a servomotor according to claim 10 wherein said predetermined time is within the range of between 10 microseconds and 100 microseconds.

12. A circuit configuration for the control of a servomotor according to claim 9 wherein said predetermined time is within the range of between 10 microseconds and 100 microseconds.

13. A circuit configuration for the control of a servomotor comprising:

power supply means for supplying current to said servomotor;

a final stage including a current measuring resistance, connected to said servomotor;

means for actuating said final stage to supply width-modulated current pulses to said servomotor; and means, after actuation of said final stage, for:
(a) directly sensing, based on the inductance of the servomotor, the current flow through said servomotor by way of the current measuring resistance throughout a predetermined period of time,
(b) converting analog signals sensed into corresponding digital signals, and
(c) storing said digital signals representative of the gradient of the current values throughout said predetermined period of time and for processing said stored digital signals, to detect at least one of:
(a) a short circuit in a feed line to said servomotor,
(b) a short circuit within said servomotor, and
(c) a shunt event within said servomotor.

14. The circuit configuration of claim 13, wherein said power supply means is an automotive vehicle battery.

15. In a circuit configuration for use with a servomotor of a control system in an automotive vehicle, the control system including a final stage having a power transistor and a current measuring resistance, a method for controlling the servomotor for short circuit comprising the steps of:

actuating the final stage;

after actuation of the final stage, directly sensing and storing values representing the gradient of the current flowing, based on the inductance of the servomotor, throughout a predetermined period of time through the final stage, said current flow being sensed with respect to the current measuring resistance; and subsequently analyzing the stored values representing current flow from the predetermined period of time for identifying a short circuit or shunt event within the servomotor or a supply line.

16. The method for monitoring of the servomotor according to claim 15, wherein said step of sensing occurs during a predetermined time after said power transistor has been placed in a saturated state.

17. The method for controlling the servomotor according to claim 16, wherein said predetermined time is within the range of 10 microseconds and 100 microseconds.

18. The method for controlling the servomotor according to claim 15, wherein a peak value of said current flow through said power transistor is determined for the predetermined period of time.

19. The method for controlling the servomotor according to claim 18, wherein said predetermined time is within the range of 10 microseconds and 100 microseconds.

\* \* \* \* \*